(12) United States Patent
Montalvo Urbano et al.

(10) Patent No.: US 10,025,054 B2
(45) Date of Patent: Jul. 17, 2018

(54) OPTICAL FIBER DISTRIBUTION HUB WITH FIBER ROUTING STRUCTURES

(71) Applicant: Corning Optical Communications LLC, Hickory, NC (US)

(72) Inventors: Adriana Montalvo Urbano, Reynosa (MX); Sergio Sanchez Garcia, Reynosa (MX)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/437,568

(22) Filed: Feb. 21, 2017

(65) Prior Publication Data

US 2017/0160504 A1 Jun. 8, 2017

Related U.S. Application Data

(62) Division of application No. 14/793,138, filed on Jul. 7, 2015, now Pat. No. 9,612,417.

(60) Provisional application No. 62/022,875, filed on Jul. 10, 2014.

(51) Int. Cl.
  *G02B 6/44* (2006.01)
  *H04B 10/27* (2013.01)

(52) U.S. Cl.
  CPC ......... *G02B 6/4452* (2013.01); *G02B 6/4454* (2013.01); *G02B 6/4471* (2013.01); *H04B 10/27* (2013.01)

(58) Field of Classification Search
  CPC ......... G02B 6/44; G02B 6/4452; G02B 6/447
  USPC ....................................................... 385/135
  See application file for complete search history.

(56) References Cited

U.S. PATENT DOCUMENTS

| 4,752,110 A | * | 6/1988 | Blanchet | G02B 6/4452 385/134 |
| 5,548,678 A | * | 8/1996 | Frost | G02B 6/4442 385/134 |
| 5,751,882 A | * | 5/1998 | Daems | G02B 6/4454 385/135 |
| 6,792,191 B1 | * | 9/2004 | Clapp, Jr. | G02B 6/4452 385/135 |

(Continued)

FOREIGN PATENT DOCUMENTS

| EP | 356942 B1 | 1/1995 |
| WO | 2012135312 A1 | 10/2012 |

OTHER PUBLICATIONS

International Search Report and Written Opinion PCT/US2015/039346 dated Oct. 28, 2015.

*Primary Examiner* — Kaveh C Kianni

(57) ABSTRACT

An optical fiber distribution housing is provided. The housing includes an active fiber routing structure positioned between the splitter module and the plurality of optical splice ports and/or a guide structure defining an inactive fiber routing channel. The active fiber routing structure includes a plurality of channels, and each of the plurality of channels of the active fiber routing structure is associated with a subset of optical splice ports. Each channel receives a subset of active fibers from the splitter module and guides the active fibers to the subset of optical splice ports associated with the channel. The inactive fiber guide structure receives an inactive fiber and the fiber follows a path from the splitter modules along the first wall and through the inactive fiber routing channel to the inactive fiber retainer.

3 Claims, 8 Drawing Sheets

(56) References Cited

U.S. PATENT DOCUMENTS

| | | | |
|---|---|---|---|
| 7,116,777 B2* | 10/2006 | Knudsen | H04Q 1/068 361/690 |
| D626,817 S | 11/2010 | Donowho et al. | |
| 7,889,961 B2* | 2/2011 | Cote | G02B 6/4452 385/135 |
| 7,974,105 B2 | 7/2011 | Dean, Jr. et al. | |
| 8,059,932 B2* | 11/2011 | Hill | G02B 6/4454 385/135 |
| 8,195,022 B2* | 6/2012 | Coburn | G02B 6/3897 379/325 |
| 8,285,104 B2* | 10/2012 | Davis | G02B 6/4471 385/135 |
| 8,494,329 B2* | 7/2013 | Nhep | G02B 6/3825 385/135 |
| 8,559,785 B2* | 10/2013 | Barlowe | G02B 6/4471 385/135 |
| 8,600,208 B2* | 12/2013 | Badar | G02B 6/4453 385/135 |
| 2003/0103750 A1* | 6/2003 | Laporte | G02B 6/445 385/134 |
| 2003/0174996 A1* | 9/2003 | Henschel | G02B 6/2804 385/135 |
| 2004/0001686 A1* | 1/2004 | Smith | G02B 6/445 385/135 |
| 2005/0175307 A1* | 8/2005 | Battey | G02B 6/445 385/135 |
| 2007/0031100 A1* | 2/2007 | Garcia | G02B 6/4452 385/135 |
| 2009/0110359 A1 | 4/2009 | Smith et al. | |
| 2009/0238531 A1* | 9/2009 | Holmberg | G02B 6/445 385/135 |
| 2009/0324187 A1* | 12/2009 | Wakileh | G02B 6/4452 385/135 |
| 2011/0211799 A1* | 9/2011 | Conner | G02B 6/4471 385/135 |
| 2011/0268407 A1* | 11/2011 | Cowen | G02B 6/4452 385/135 |
| 2011/0285265 A1 | 11/2011 | Anderson et al. | |
| 2011/0286712 A1* | 11/2011 | Puetz | G02B 6/4452 385/135 |
| 2011/0293277 A1* | 12/2011 | Bradea | H04J 14/0282 398/66 |
| 2012/0219262 A1 | 8/2012 | Hendrix et al. | |
| 2012/0237173 A1* | 9/2012 | Alston | G02B 6/4442 385/97 |
| 2014/0079365 A1* | 3/2014 | Hill | G02B 6/4455 385/135 |
| 2014/0086545 A1* | 3/2014 | Solheid | G02B 6/4453 385/135 |
| 2014/0219622 A1* | 8/2014 | Coan | G02B 6/445 385/135 |
| 2015/0117829 A1* | 4/2015 | Allen | G02B 6/4454 385/135 |
| 2015/0355428 A1* | 12/2015 | Leeman | G02B 6/4455 385/135 |

* cited by examiner

OPTICAL FIBER DISTRIBUTION HUB WITH FIBER ROUTING STRUCTURES

RELATED APPLICATIONS

This application is a divisional of U.S. patent application Ser. No. 14/793,138, filed Jul. 7, 2015, which claims the benefit of priority under 35 U.S.C. § 119 of U.S. Provisional Application No. 62/022,875, filed on Jul. 10, 2014, the content of which is relied upon and incorporated herein by reference in their entirety.

BACKGROUND

Field

The disclosure relates generally to fiber optic networks and more particularly to equipment housings for use within fiber optic networks.

Technical Background

Within a fiber optic network, various upstream or input fibers carry optical signals including data to be delivered to multiple downstream users or customers. In some fiber optic networks, a splitting device in a splitter module receives an input optical fiber from a service provider and splits the optical signal carried by the input optical fiber into a plurality of optical signals carried by respective output optical fibers that each distributes to the appropriate subscriber or downstream user. A fiber distribution hub or cabinet provides the housing and support for the splitter modules, the input fibers, the output fibers, the splicing hardware, etc. that operates to delivering data service to the network of an end user.

SUMMARY

One embodiment of the disclosure relates to an optical fiber distribution housing. The housing includes a plurality of walls, and each of the plurality of walls include inner surfaces that together define an interior compartment of the housing. The housing includes a splitter module supported from the inner surface of a first wall of the plurality of walls. The housing includes an input fiber each connected to the splitter module and a plurality of output fibers extending from each of the plurality of splitter modules. The output fibers include a plurality of active fibers carrying optical signals split from the input fiber by the splitter module. The housing includes a plurality of optical splice ports configured to couple an active output fiber from the splitter module to a downstream network, and the optical splice ports arranged in a stack extending in a direction from a second wall of the plurality of walls to a third wall of the plurality of walls. The housing includes an active fiber routing structure positioned between the splitter module and the plurality of optical splice ports. The active fiber routing structure includes a plurality of channels displaced from each other in a direction from the second wall to the third wall, and each of the plurality of channels of the active fiber routing structure is associated with a subset of optical splice ports. Each channel receives a subset of active fibers from the splitter module and guides the active fibers to the subset of optical splice ports associated with the channel.

An additional embodiment of the disclosure relates to an optical fiber distribution system. The system includes a plurality of walls, and each of the plurality of walls includes inner surfaces that together define an interior compartment of the housing. The system includes a plurality of splitter modules supported from the inner surface of a first wall of the plurality of walls. The system includes a plurality of input fibers each connected to one of the splitter modules and a plurality of output fibers extending from each of the plurality of splitter modules. The output fibers include at least one inactive fiber that is not carrying an optical signal from the input fiber. The system includes an inactive fiber retainer coupled to an inner surface of a second wall of the plurality of walls. The system includes a guide structure defining an inactive fiber routing channel between an internal surface of the guide structure and the inner surface of the first wall. The at least one inactive fiber follows a path from the splitter modules along the first wall and through the inactive fiber routing channel to the inactive fiber retainer.

An additional embodiment of the disclosure relates to a modular fiber distribution cabinet configured to receive a plurality of input fibers and split each input fiber into a plurality of output fibers. The cabinet includes a plurality of walls, and each of the plurality of walls includes inner surfaces that together define an interior compartment of the housing. The cabinet includes a splitter module support structure supported from the inner surface of a first wall of the plurality of walls and configured to support a plurality of splitter modules each including an input connector and an output connector. The cabinet includes an optical splice cassette support structure supported by one of the plurality of walls. The cabinet includes an active fiber routing structure positioned between the splitter module support structure and the optical splice cassette support structure. The active fiber routing structure includes a plurality of channels displaced from each other in a direction from a second wall to a third wall, and each channel is configured to receive a subset of active fibers from the splitter modules and to guide the active fibers to an optical splice cassette associated with the channel. The cabinet includes an inactive fiber retainer coupled to an inner surface of the second wall. The cabinet includes a guide structure coupled to the first wall between the splitter modules and the second wall such that an inactive fiber routing channel is defined between an internal surface of the guide structure and the inner surface of the first wall.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Referring generally to the figures, various embodiments of an optical fiber distribution housing or cabinet including a routing system for routing and organizing active and inactive fibers within the cabinet are shown. In general, the modular fiber distribution housing is configured to hold a relatively large number of splitter modules that each includes a relatively large number of output fibers. Accordingly, the fiber distribution housing of the present application includes an active fiber routing structure that includes a plurality of channel structures associated with a subset of splice cassettes that are located in physical proximity to each other within the cabinet. The channels of the active fiber routing structure act to group active fibers together that are to be connected to the same subset of splice cassettes. The channels also act to separate one group of active fibers from other groups of active fibers that are to be connected to a different subset of splice cassettes. In addition, the active fiber routing structure also acts to route active fibers in a direction different from the routing of inactive fibers which allows the user of the cabinet to more quickly identify, activate and properly route a previously inactive fiber to the appropriate splice cassette.

In addition, in various embodiments, the fiber distribution cabinet of the present application also includes various structures for organizing and separating inactive fibers from the active fibers. In various embodiments, the inactive fiber routing structure includes a structure that defines a channel adjacent the output ports of the splitter modules. The channel of the inactive fiber routing structure receives inactive fibers and directs them to an inactive fiber retaining structure or "parking lot" that retains inactive fibers until they are needed. In various embodiments, the routing path defined by the inactive fiber routing structure is distinct from the active fiber path defined by the active fiber routing structure further facilitating the separation of active and inactive fibers within the cabinet.

Figure 1:
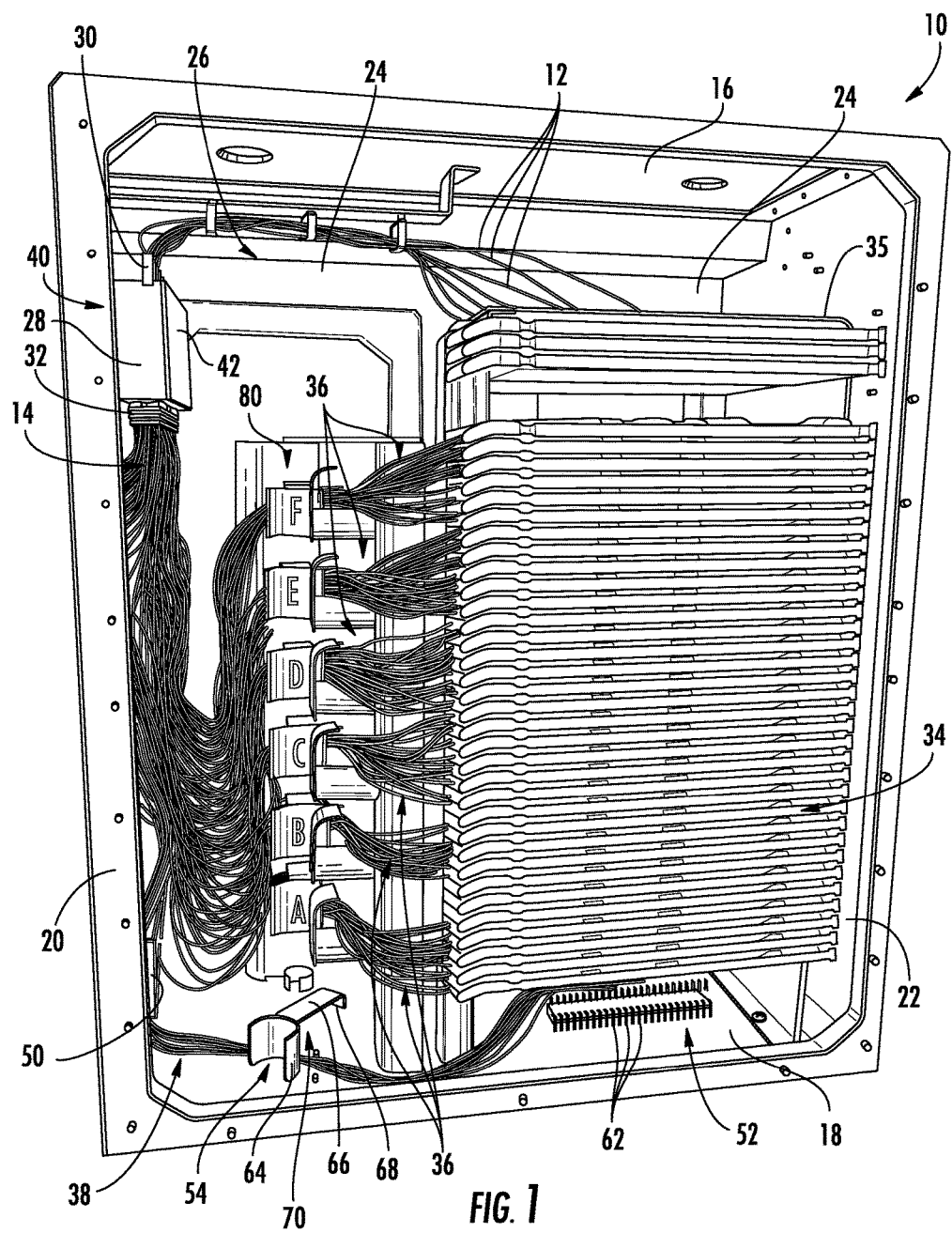
FIG. 1 is a perspective view of a modular fiber distribution cabinet according to an exemplary embodiment.

Referring to FIG. 1, a modular fiber distribution hub or housing, shown as fiber distribution cabinet 10, is shown according to an exemplary embodiment. In general, cabinet 10 provides a housing and structure for receiving optical signals carried by optical fibers in fiber optic cable from a point upstream of the cabinet 10 and from a service provider, for splitting the optical signal into multiple output signals and for distributing the split optical signals to the optical network downstream of the cabinet 10 and to subscribers. In general, cabinet 10 includes an upper wall 16, a lower wall 18, a left sidewall 20, a right sidewall 22 and rear wall 24, and cabinet 10 will include a front wall or door which is removed in FIG. 1 to show the interior of cabinet 10. The inner surfaces of the walls of cabinet 10 define an interior compartment 26 sized to hold the various components of cabinet 10 discussed herein.

Cabinet 10 includes a plurality of splitter modules 28 located within interior compartment 26 of cabinet 10. In general, splitter modules 28 contain a splitting device and include an input port 30 through which input optical fibers 12 enter the splitter module 28 and an output port 32 through which one or more output fibers 14 exit the splitter module 28. The input optical fiber 12 may extend from splice cassette 34 where it was optically coupled to an optical fiber from a fiber optic cable entering cabinet 10 from a service provider located upstream of the cabinet 10 in the fiber optic network. At least some of output fibers 14 extend from splitter modules 28 to one or more splice cassettes 34, where it may be coupled to a fiber optic cable extending downstream from the cabinet 10 toward a subscriber so as to provide communication service from the service provider to the particular subscriber. The splitting device in the splitter modules 28 splits optical signals carried by the input fiber 12 into one or more output signals to be carried by output fibers 14.

Splitter modules 28 generally are any fiber optic device that splits optical signals from input fibers 12 and directs the signal to the appropriate output fiber 14. In general, output fibers 14 may be either active fibers or inactive fibers. Active fibers, shown as active fibers 36, are a subset of output fibers 14 that are currently carrying signals or data to a user's communication network via optical coupling between the active fiber 36 and the user's network provided by splice cassettes 34. Inactive fibers, shown as inactive fibers 38, are a subset of output fibers that are not currently carrying signals and are not currently connected to a user's network via splice cassettes 34. In general however, as the operator of cabinet 10 provides communication to a new network, an inactive fiber 38 is activated becoming an active fiber 36, and then following activation, the newly active fiber 36 is coupled to the user's network via a connection with the appropriate port within the appropriate cassette 34.

In various embodiments, splitter modules 28 can be a wide variety of splitter modules. In one embodiment, each splitter module 28 is a 1×32 splitter module configured to distribute signals from a single input fiber 12 to up to 32 output fibers 14. In another embodiment, each splitter module 28 is a dual 1×16 splitter module configured to distribute signals from two input fibers 12 to up to 32 output fibers 14. In another embodiment, each splitter module 28 is a dual 1×8 splitter module configured to distribute signals from two input fibers 12 to up to 16 output fibers 14. In another embodiment, each splitter module 28 is a 1×64 splitter module configured to distribute signals from a single input fiber 12 to up to 64 output fibers 14. In various specific embodiments, splitter modules 28 are LS Series splitter modules available from Corning Optical Communications LLC.

Figure 2:
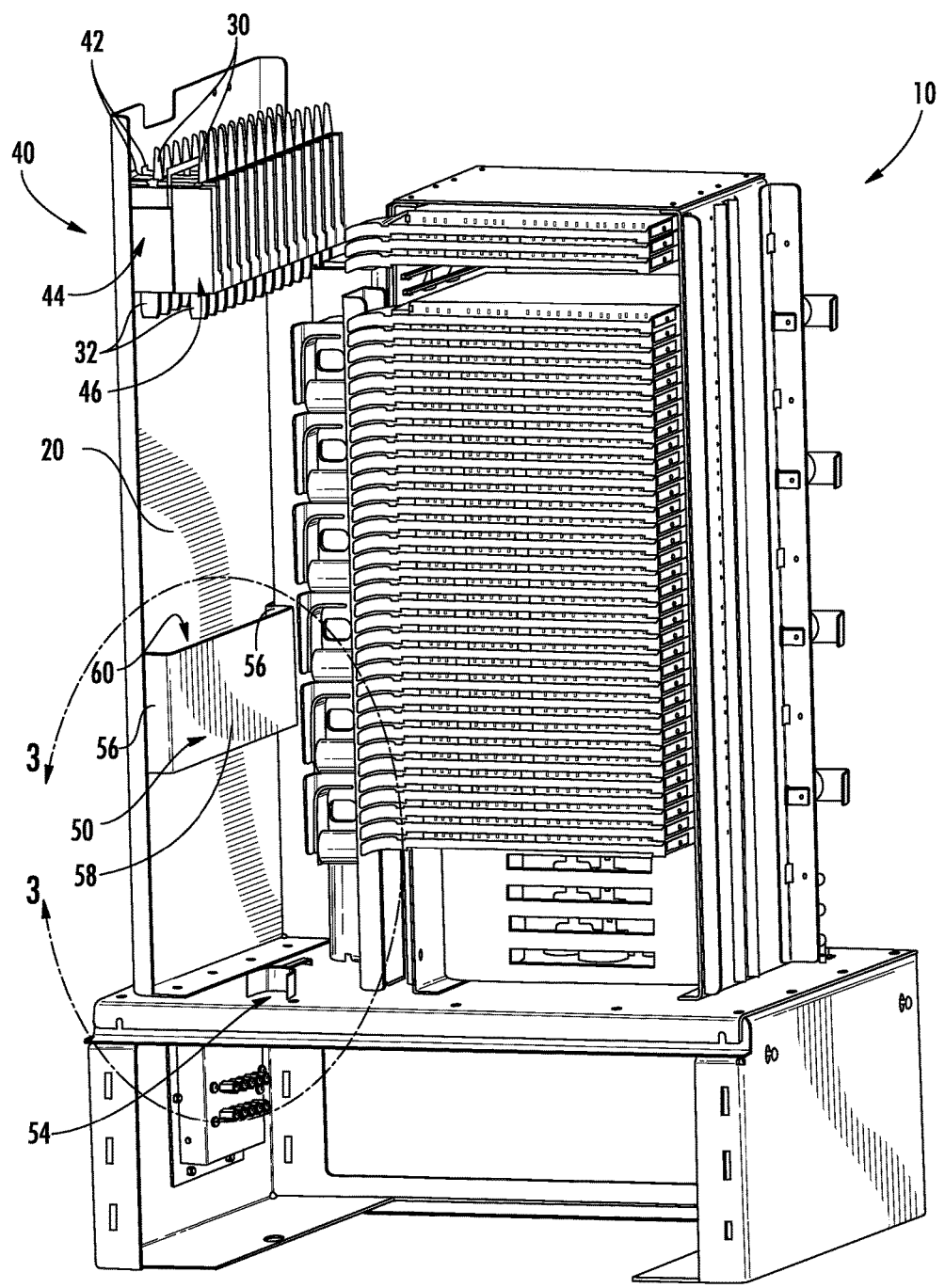
FIG. 2 is a perspective view of a modular fiber distribution cabinet with fibers removed according to an exemplary embodiment.
Figure 3:
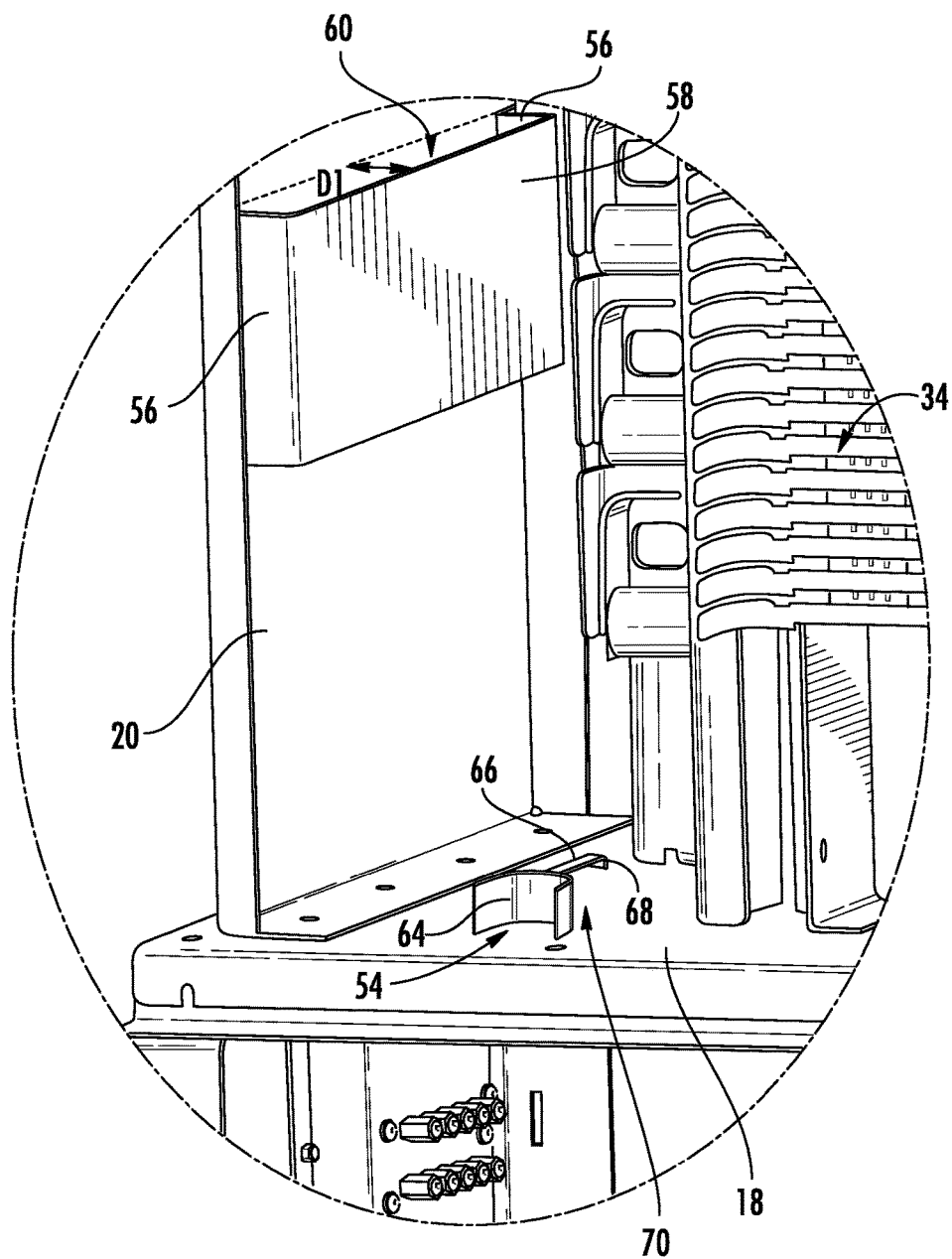
FIG. 3 is a detailed perspective view of an inactive fiber routing system according to an exemplary embodiment.

As shown in FIG. 1, cabinet 10 includes a splitter module support area 40 of cabinet 10, and in the embodiment shown is located in the upper left-hand region of cabinet 10. In various embodiments as shown in FIG. 2, cabinet 10 includes a splitter module support system 42 configured to support one or more splitter module 28 from the inner surface of wall 20. In one embodiment, as shown in FIG. 2, splitter module support system 42 is configured to support two or more rows of splitter modules 28 from the inner surface of one of the walls of cabinet 10. In the embodiment shown, splitter module support system 42 is configured to support splitter modules 28 in two rows, shown as first row 44 and second row 46, from the inner surface of left sidewall 20. In various other embodiments, support system 42 may be configured to support rows of splitter modules from any of the walls of cabinet 10, and may be configured to support three, four or more rows of splitter modules.

Support system 42 is configured to support splitter modules 28 cantilevered from the inner surface of sidewall 20 such that first row 44 is located between the inner surface of sidewall 20 and second row 46. Support system 42 may include a system of holes, tabs and brackets to support splitter modules 28 as shown in FIGS. 1 and FIG. 2. However, in other embodiments, any suitable mechanism, such as screws, bolts, etc. may be used to support splitter modules 28 within cabinet 10.

In various embodiments, support system 42 is configured to support a relatively large number of splitter modules within a cabinet 10. In various embodiments, support system 42 is configured to support two rows of at least eight splitter modules 28 each, and in a specific embodiment, support system 42 is configured to support two rows of at least ten splitter modules 28 each. In a more specific embodiment, support system 42 is configured to support two rows of up to fourteen splitter modules 28 each. Thus, as can be seen in FIG. 1, these larger numbers of splitter modules 28 result in a cabinet with a large number of output fibers 14.

In various embodiments, cabinet 10 is equipped with various routing structures for routing, separating and organizing the different types of output fibers 14 within cabinet 10. Referring to FIG. 1 and FIG. 2, in various embodiments, cabinet 10 is configured to route, separate and store inactive output fibers 38 in a manner that keeps them separate from active fibers 36. In such embodiments, cabinet 10 includes a first inactive fiber routing guide, shown as bracket 50, an inactive fiber retainer, shown as fiber holder 52, and a second inactive fiber routing guide, shown as guide arm 54.

As shown best in FIG. 2, bracket 50 is a substantially u-shaped bracket having left and right sidewalls 56 and a back wall 58. The inner surfaces of bracket 50 in combination with the inner surface of sidewall 20 define an inactive fiber routing channel, shown as channel 60. As shown in FIG. 2, bracket 50 and channel 60 are located along the inner surface of the same wall of cabinet 10 that supports splitter modules 28. In this embodiment, bracket 50 and channel 60 are located between splitter modules 28 and bottom wall 18. Specifically, bracket 50 is located below splitter modules 28 such that the top opening of channel 60 faces output connectors 32 of splitter modules 28.

Bracket 50 is shaped to maintain a relatively low profile relative to sidewall 20 such that inactive fibers 38 are conveniently held out of the way within cabinet 10. Channel 60 has depth dimension shown as D1. In various embodiments, D1 is between 1 and 5 inches.

Referring to FIG. 1, fiber holder 52 is located along bottom wall 18. In the embodiment shown, fiber holder 52 is located between bottom wall 18 and the stack of optical splice cassettes 34. In one embodiment, fiber holder 52 includes a plurality of fiber retainers, shown as fiber slots 62. In general, fiber slots 62 are configured to form a friction fit with the outer surface of inactive fibers 38 such that the inactive fibers are maintained along bottom wall 18 until needed.

Guide arm 54 is also located along bottom wall 18. Guide arm 54 includes a support column 64 coupled to the inner surface of bottom wall 18 and an upper arm portion 66. Upper arm portion 66 extends outward from an upper portion (e.g., upper half, upper edge, etc.) of column 64 and includes an end section 68 extending downward from the end of arm portion 66 opposite column 64. In the embodiment shown, upper arm portion 66 is substantially perpendicular (it should be understood that as used herein substantially perpendicular relates a range of angular positions within 10 degrees of perpendicular) to column 64 such that arm portion 66 is substantially horizontal, and in this embodiment, end section 68 is substantially perpendicular to arm portion 66. In various embodiments as shown in FIG. 1, an inner surface of arm portion 66 faces the inner surface of bottom wall 18 such that guide arm 54 and bottom wall 18 define a second inactive fiber channel 70. End section 68 acts as a hook or barrier that limits unwanted movement of an inactive fiber 36 outward along the lower surface of arm portion 66.

As shown best in FIG. 1, guide arm 54 is located between bracket 50 and retainer 52. In this arrangement, inactive output fibers 38 extend from splitter modules 28 along sidewall 20, downward through channel 60, along bottom wall 18 through channel 70 and into retainer 52. In this arrangement, inactive output fibers are routed and held substantially along the inner surfaces of sidewall 20 and bottom wall 18 at a position separated from active fibers 36.

In addition to the routing structure for managing inactive fibers within cabinet 10, cabinet 10 also includes an active fiber routing structure, shown as structure 80, located within cabinet 10 between splitter modules 28 and splice cassettes 34, as shown in FIG. 1. In general, structure 80 is configured to route active fibers 36 from splitter modules 34 in an orderly fashion in a way that keeps active fibers 36 separate from inactive fibers 38. In addition, structure 80 is also configured to subdivide and retain active fibers 36 into groups associated with subsets of cassettes 34 that are to receive particular active fibers 36. In this embodiment, structure 80 includes a lower end coupled to bottom wall 18, and structure 80 extends upward toward top wall 16.

Figure 4:
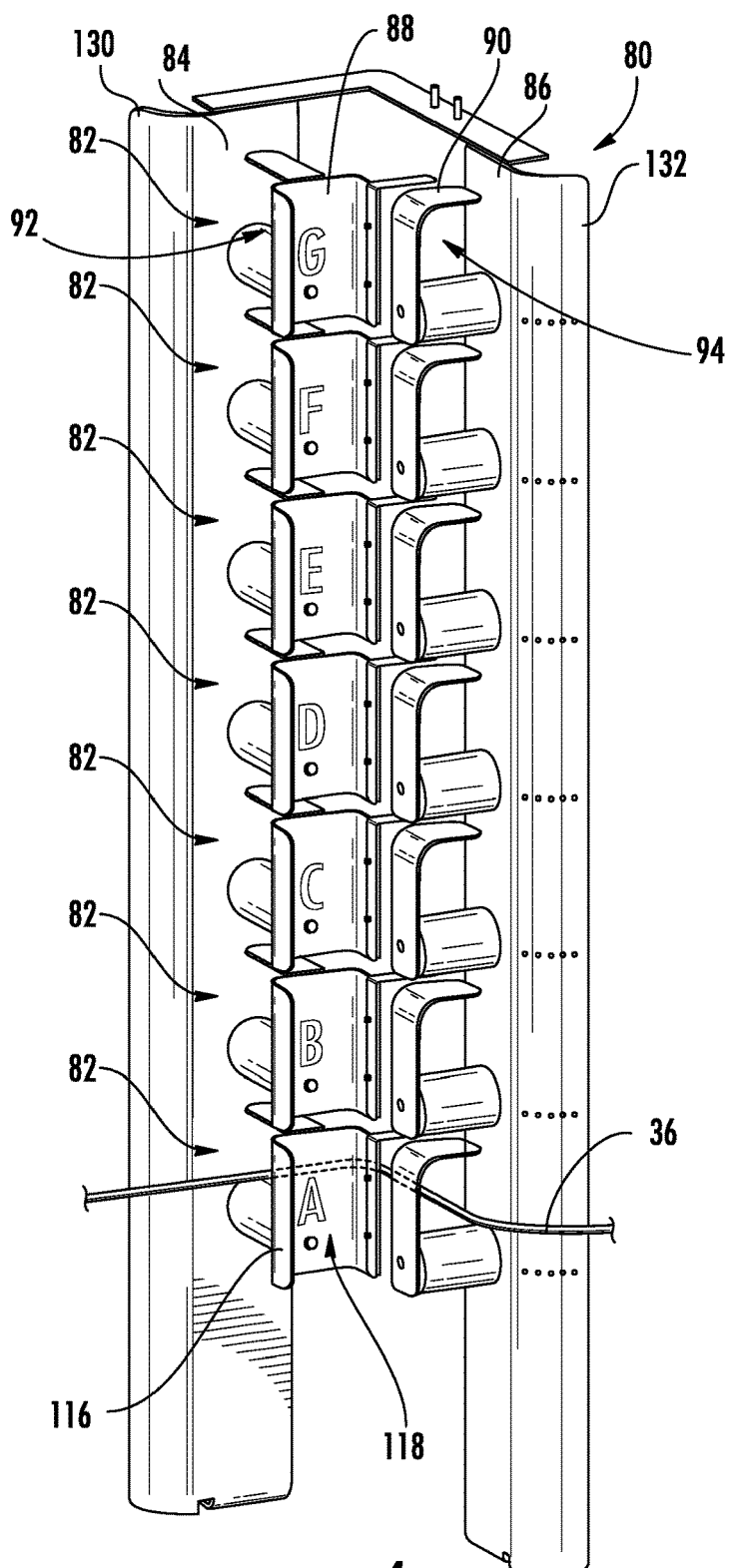
FIG. 4 is a detailed perspective view of an active fiber routing system according to an exemplary embodiment.

Referring to FIG. 4, a detailed view of structure 80 is shown according to an exemplary embodiment. Structure 80 includes a plurality of active fiber routing channels 82, and each routing channel 82 is designated with an identifying indicia 118, shown for example as letters A-G. The embodiment of structure 80 as shown in FIG. 4 includes seven channels 82, each identified by a letter A-G. However, in other embodiments, structure 80 may be configured with different numbers of routing channels 82 to suit the needs of a particular cabinet design. For example, the version of structure 80 shown in FIG. 1, includes six channels 82, each identified by a letter A-F. In other embodiments, structure 80 may include more than seven routing channels 82 or may include less than six routing channels 82.

As shown in FIG. 4, structure 80 includes a first support beam 84 and a second support beam 86 that are coupled to and extend from bottom wall 18. In general, support beams 84 and 86 support the structures that define channels 82 of the structure 80. In the embodiment in which support beams 84 and 86 extend vertically and substantially perpendicular from bottom wall 18. As shown in FIG. 1, channels 82 are displaced in the vertical direction from each other, and in a specific embodiment, channels 82 are evenly spaced along the length of structure 80.

In the specific embodiment shown, structure 80 includes a plurality of brackets 88 supported by and extending from beam 84 and a plurality of brackets 90 supported by and extending from beam 86. Brackets 88 each include an internal surface defining a first channel portion 92, and brackets 90 each include internal surfaces defining a second channel portion 94. In general, first channel portion 92 and second channel portion 94 form at least a portion of each routing channel 82, and channel portion 92 is positioned relative to second channel portion 94 to guide active fibers 36 (an exemplary active fiber 36 is shown in FIGS. 4 and 5) through a bend to properly direct the active fiber to the appropriate splice cassettes 34.

Figure 5:
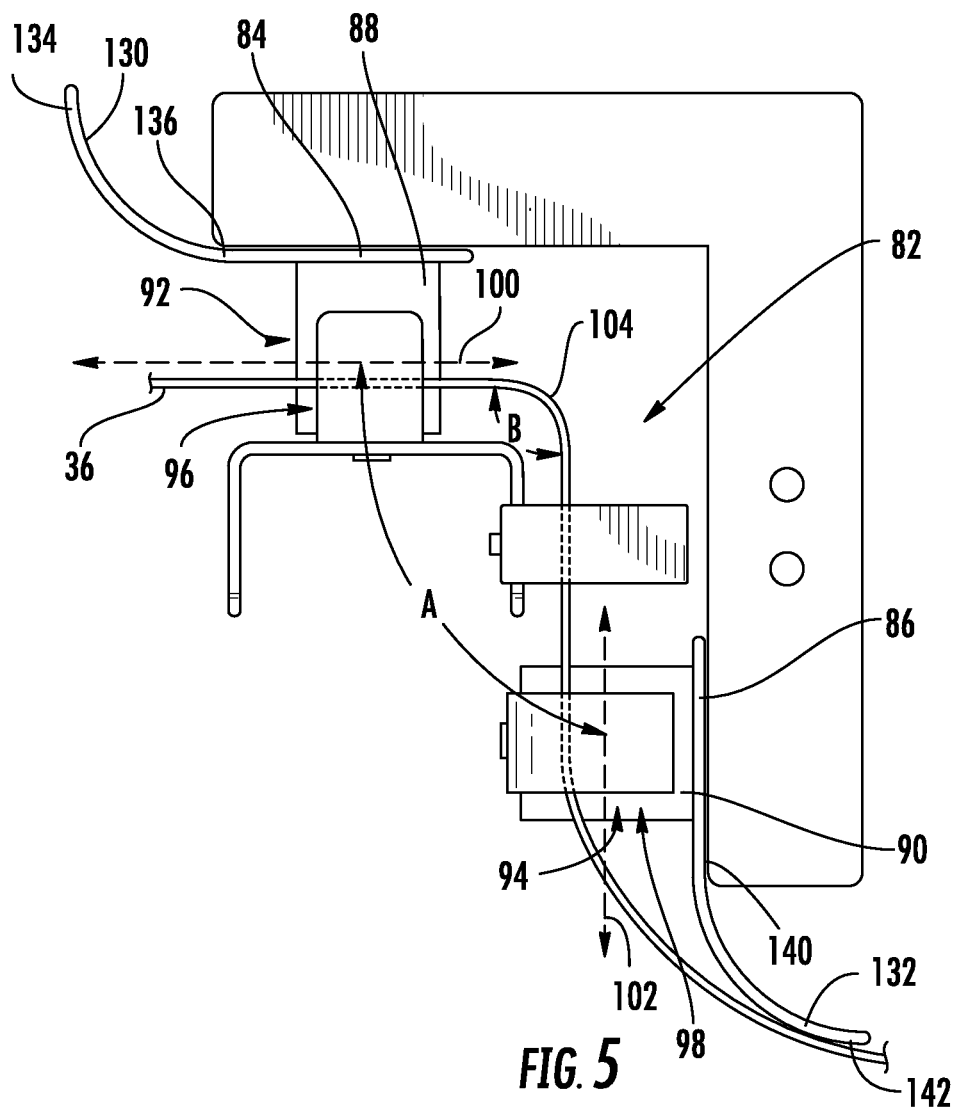
FIG. 5 is a top view of the active fiber routing system of FIG. 4 according to an exemplary embodiment.

Referring to FIG. 5, in various embodiments, first channel portion 92 defines the inlet or entrance 96 into channel 82, and second channel portion 94 defines the outlet or exit 98 from channel 82. In the embodiment shown, entrance 96 is located between splitter modules 28 and second channel portion 94, and receives active fibers 36 from splitter modules 28. In such embodiments, entrance 96 faces wall 20 supporting splitter modules 28. Further, exit 98 is located between first channel portion 92 and splice cassettes 34, and in this embodiment, exit 98 generally faces toward the front of cabinet 10.

In the embodiment shown, first channel portion 92 is nonparallel to second channel portion 94 such that a central axis 100 of first channel portion 92 forms an angle A with central axis 102 of second channel portion 94. In one embodiment, angle A is between 90 degrees and 180 degrees, specifically is between 90 degrees and 135 degrees and more specifically is 90 degrees. The relative angled position between first channel portion 92 and second channel portion 94 results in exit 98 being offset relative to the position of inlet 96, and in the embodiment shown, exit 98 is offset from inlet 96 in a direction away from splitter modules 28 and toward splice cassettes 34 in the lateral direction and away from rear wall 24 and toward the front of cabinet 10.

This arrangement routes active fibers 36 toward splice cassettes 34 and also forms a bend 104 in a portion of active fiber 36 within channel 82. In the embodiment shown, active fiber 36 includes a bend 104 such that a bend angle B is formed between portions of active fiber 36 before and after bend 104. In one embodiment, angle B is between 90 degrees and 180 degrees, and specifically is between 90 degrees and 135 degrees. In one embodiment, because a large number of active fibers 36 extend through each channel 82 as shown in FIG. 1, and each fiber may be bent differently as it traverses channel 82, angle B represents an average bend angle or an intend bend angle.

Figure 6:
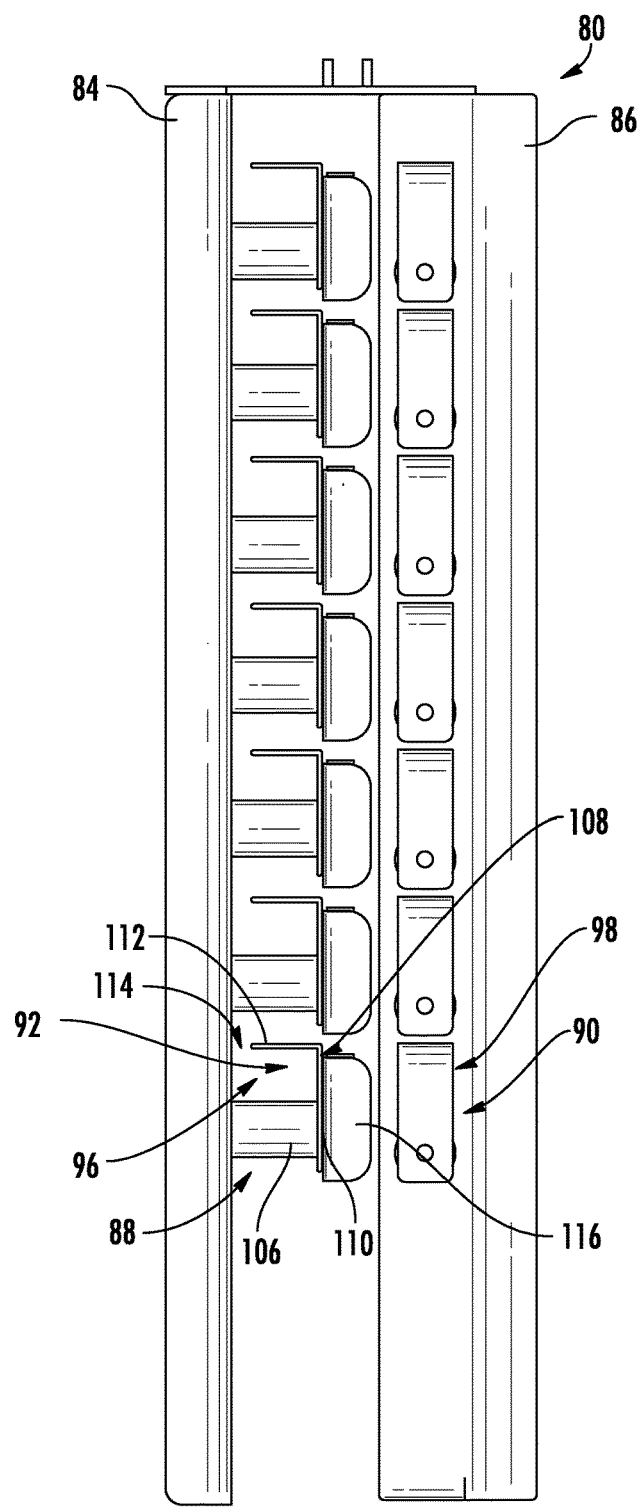
FIG. 6 is a left-side elevation view of the active fiber routing system of FIG. 4 according to an exemplary embodiment.

Referring to FIG. 6, the structure of bracket 88 defining first channel portion 92 is shown in detail. Each bracket 88 includes a support post 106 extending outward from and substantially perpendicular to first support beam 84. An L-shaped bracket 108 extends from the outer end of support post 106 and includes a vertical section or wall 110 and a horizontal section or wall 112 extending back toward support beam 84 from an upper edge of vertical section 110. The inner surfaces of L-shaped bracket 108 and the upper surface of post 106 defines first channel portion 92.

In one embodiment, as shown in FIG. 6, horizontal wall section 112 of L-shaped bracket 108 has a length that is less than the length of post 106 such that a gap 114 is formed between wall section 112 and beam 84. Gap 114 is located in the upper left corner of first channel portion 92 as viewed from splitter module 28 (e.g., the orientation of FIG. 6). Gap 114 allows active fibers to set into first channel portion 92 such that threading of the fiber through channel portion 92 is not needed.

Figure 7:
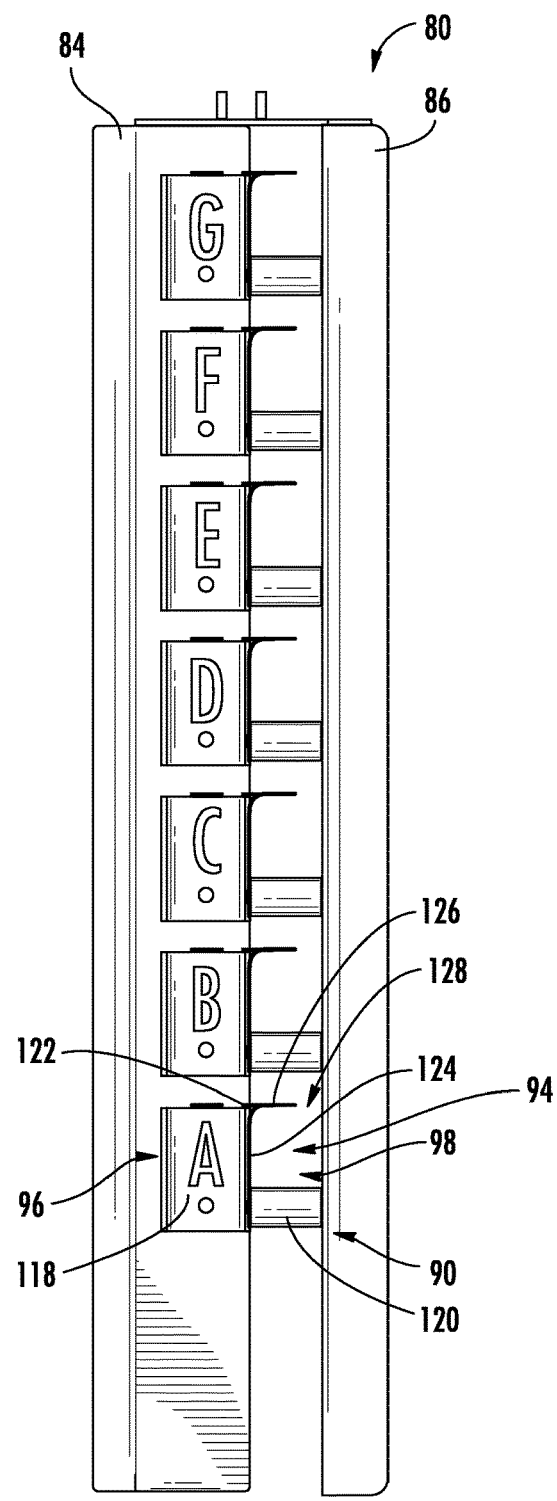
FIG. 7 is a front elevation view of the active fiber routing system of FIG. 4 according to an exemplary embodiment.

As shown in FIGS. 4, 6 and 7, bracket 88 includes a front wall portion 116. Front wall portion 116 is a general U-shaped wall section that includes a central area for receiving the indicia 118 (shown as letters A-G in FIG. 4) that identifies a particular channel 82. It should be understood that while the figures show indicia 118 as letters, any other suitable indicia, such as numbers, colors, etc., may be used to identify a particular channel 82. In one embodiment, indicia 118 are stamped or embossed onto the surface of front wall portion 116.

Referring to FIG. 7, the structure of bracket 90 defining second channel portion 94 is shown in detail. Each bracket 90 includes a support post 120 extending outward from and substantially perpendicular to second support beam 86. An L-shaped bracket 122 extends from the outer end of support post 120 and includes a vertical section or wall 124 and a horizontal section or wall 126 extending back toward support beam 86 from an upper edge of vertical section 124. The inner surfaces of L-shaped bracket 122 and the upper surface of post 120 defines second channel portion 94.

In one embodiment, as shown in FIG. 7, horizontal wall section 126 of L-shaped bracket 122 has a length that is less than the length of post 120 such that a gap 128 is formed between wall section 126 and beam 86. Gap 128 is located in the upper right corner of second channel portion 94 as viewed from the front of cabinet 10 (e.g., the orientation of FIG. 7). Gap 128 allows active fibers to set into second channel portion 94 such that threading of the fiber through channel portion 94 is not needed.

Referring back to FIG. 5, support structure 80 includes curved guide surfaces adjacent to the entrance and exit of each channel 82. As shown in FIG. 4 and FIG. 5, support structure 80 includes an input guide surface 130 adjacent entrance 96 and an output guide surface 132 adjacent exit 98. In the embodiment shown, input guide surface 130 is a portion of support beam 84 that extends vertically along the length of support beam 84, and output guide surface 132 is a portion of support beam 86 that extends vertically along the length of support beam 86. In this embodiment, input guide surface 130 curves from a position 134 that is facing sidewall 20 to a position 136 substantially perpendicular to sidewall 20 and that faces the front of cabinet 10. In such embodiments, output guide surface 132 curves from a position 140 that is substantially parallel to sidewall 20 to a position 142 that faces toward the front of cabinet 10. In such embodiments, guide surfaces 130 and 132 remove or reduce potential damage to active fibers 36 that may otherwise be caused by sharp angled surfaces leading into and out of channels 82 of support structure 80.

As noted above, in addition to separating active fibers 36 from inactive fibers 38, the multiple channels 82 of structure 80 are each associated with a subset of optical splice cassettes 34 such that each channel 82 acts to guide active fibers to the proper subset of optical splice cassettes 34 that include the appropriate optical port to which a given active fiber is to be spliced Thus, in this manner, channels 82 of structure 80 also act to separate one group of active fibers 36 connected to a first set of splice cassettes 34 from groups of active fibers 36 to be connected to other sets of splice cassettes 34. In this manner, structure 80 facilitates the orderly routing of active fibers 36 to the appropriate splice cassettes 34 by grouping together active fibers 36 that are bound for a group of cassettes 34 that each are in physical proximity to each other.

Figure 8:
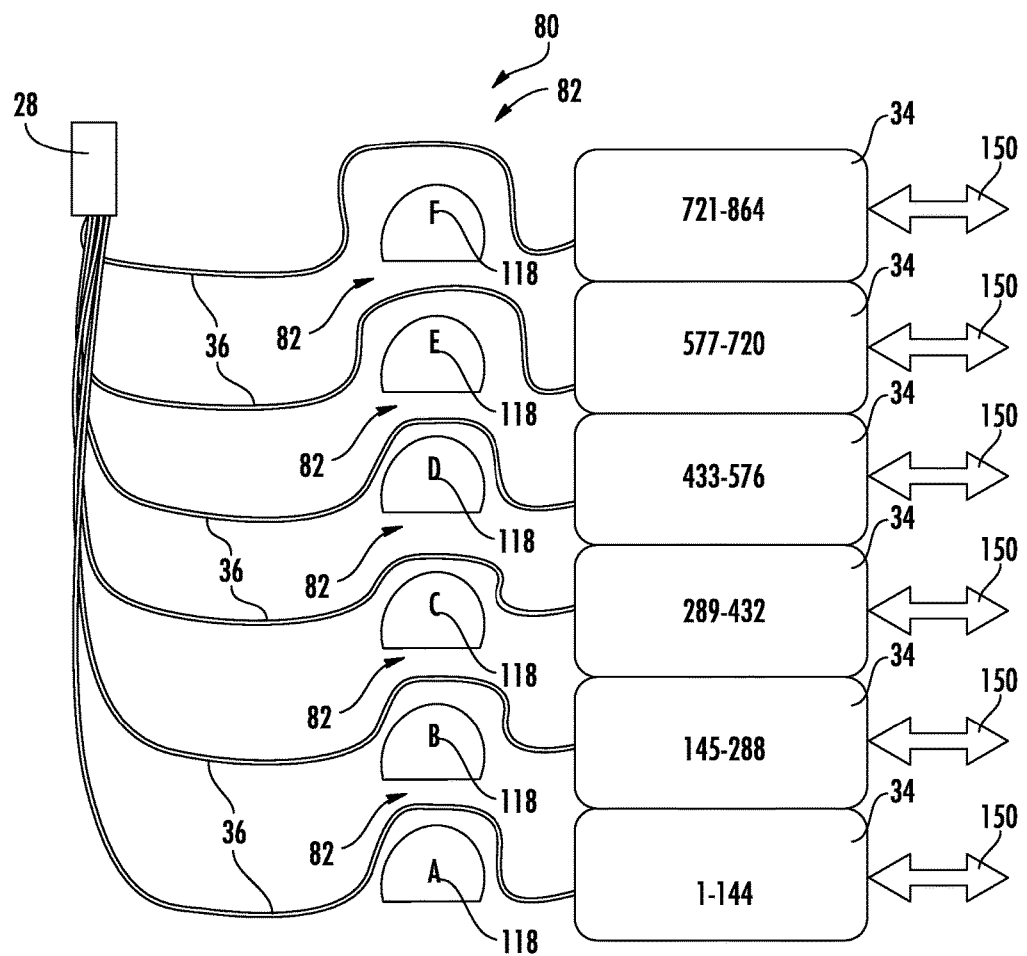
FIG. 8 is a schematic view of the active fiber routing system of FIG. 4 showing coupling to optical splice cassettes according to an exemplary embodiment.

FIG. 8 shows a schematic of the active fiber routing organization provided by structure 80, according to an exemplary embodiment. As shown in FIG. 8, active fibers 36 extend from splitter modules 28 through channels 82 of routing structure 80 to be coupled to the splice ports of splice cassettes 34. It should be understood that while FIG. 8 shows a single exemplary active fiber 36 extending from splitter module 28 through channel 82, a group of active fibers 36 including a fiber connected to each port of cassette 34 may be routed through each channel 82. As represented by arrows 150, communication is provided to a user's network from cassette 34, and specifically, in one embodiment, each active fiber 36 may serve an individual user's networks.

As shown in FIG. 8, the first routing channel 82, designated by the letter A, is associated with a first subset of optical splice ports of one or more of cassettes 34, and each subsequent routing channel 82 moving along the length of structure 80 is associated with the next sequential set of splice ports of the next group of one or more cassettes 34. In this arrangement, each routing channel 82 is associated with a set of optical splice ports or cassettes 34 that are in physical proximity to the associated channel.

For example, as shown in FIG. 1 and FIG. 8, the lowest routing channel 82 is associated with and guides fibers 36 to the physically lowest set of optical splice cassettes 34. The routing channel 82 directly above the lowest routing channel is associated with and guides fibers 36 to the set of optical splice cassettes 34 located directly above the lowest set of optical splice cassettes, and so on. This arrangement facilitates the orderly routing and splicing of active fibers 36 by preventing active fibers 36 from being passed randomly through one of the channels 82 on its way to splicing into a cassette 34. Utilizing the ordering arrangement provided by structure 80 allows for active fibers 36 to be organized and separated even when fibers 36 are connected to the splice ports of cassettes 34 in a non-sequential manner. The different indicia 118 associated with each channel 82 allows the user to know which channel 82 an active fiber 36 should pass through on its path to a particular splice port of cassette 34.

In the exemplary embodiment shown, each cassette 34 includes a plurality of separate splice ports and each splice port of each cassette 34 is associated with a splice port ID number. As shown schematically in FIG. 8, the splice ports of all cassettes 34 located within cabinet 10 are consecutively numbered such that the first cassette 34, shown as the lowest cassette in the cassette stack, includes the first group of splice ports, the next cassette 34 above in the stack includes the next set of splice port numbers, and so on.

Accordingly in various embodiments, the first routing channel 82, designated by the letter A, is associated with a first set of consecutively numbered splice ports. The second routing channel 82, designated by the letter B, is associated with a second set of consecutively numbered splice ports. The third routing channel 82, designated by the letter C, is associated with a third set of consecutively numbered splice ports. The fourth routing channel 82, designated by the letter D, is associated with a fourth set of consecutively numbered splice ports. The fifth routing channel 82, designated by the letter E, is associated with a fifth second set of consecutively numbered splice ports. The sixth routing channel 82, designated by the letter F, is associated with a sixth set of consecutively numbered splice ports. As shown by the exemplary active fiber 36 in FIG. 8, each routing channel 82 guides the fiber to one of the consecutively numbered splice ports associated with the particular channel. In a specific embodiment as shown in FIG. 8, cabinet 10 includes 864 splice ports evenly distributed among the six cassettes 34 shown in FIG. 8.

In various embodiments, the walls of the cabinet 10 and the components of the fiber routing structures are formed from a rigid material and may be formed from a metal material, such as steel or aluminum or other suitably strong metal material. In one embodiment, the fiber routing structure is formed from an aluminum material including an outer powder coating that can be colored as desired for a particular application. In various embodiments, at least some components of fiber routing structures, such as support posts 106 and 120, are made from a rigid polymer material such as PVC.

Cabinet 10 and the fiber routing structures can be used in conjunction with fiber distribution cabinets, splitter modules and fibers of a wide variety of sizes and designs. In one embodiment, cabinet 10 has a height between 40 inches and 60 inches, a width between 20 inches and 40 inches and a depth between 10 inches and 30 inches. In a specific embodiment, cabinet 10 has a height of 46 inches, a width of 26 inches and a depth of 19.3 inches.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber distribution system comprising:
    a plurality of walls, each of the plurality of walls including inner surfaces that together define an interior compartment of the housing;
    a plurality of splitter modules supported from the inner surface of a first wall of the plurality of walls;
    a plurality of input fibers each connected to one of the splitter modules;
    a plurality of output fibers extending from each of the plurality of splitter modules, wherein the output fibers include at least one inactive fiber that is not carrying an optical signal from the input fiber;
    an inactive fiber retainer coupled to an inner surface of a second wall of the plurality of walls;
    a guide structure defining an inactive fiber routing channel between an internal surface of the guide structure and the inner surface of the first wall, wherein the at least one inactive fiber follows a path from the splitter modules along the first wall and through the inactive fiber routing channel to the inactive fiber retainer;
    an inactive fiber routing arm coupled to the inner surface of the second wall defining a second inactive fiber routing channel between an inner surface of the inactive fiber routing arm and an inner surface of the second wall, wherein the second inactive fiber routing channel directs the at least one inactive output fiber along the inner surface of the second wall to the inactive fiber retainer which engages the at least one inactive output fiber holding it in place along the second wall; and
    a plurality of optical splice cassettes configured to couple an active output fiber from the splitter module to a downstream network, the optical splice cassettes arranged in a stack extending in a direction from the second wall of the plurality of walls to a third wall of the plurality of walls, wherein the inactive fiber retainer is located between the second wall and the plurality of optical splice cassettes.

2. The optical fiber distribution system of claim 1 further comprising an active fiber routing structure positioned between the splitter modules and the plurality of optical splice cassettes, the active fiber routing structure including a plurality of channels displaced from each other in a direction from the second wall to the third wall, wherein each of the plurality of channels of the active fiber routing structure is associated with a subset of optical splice cassettes, wherein each channel receives a subset of active fibers from the splitter modules and guides the active fibers to the subset of optical splice cassettes associated with the channel.

3. The optical fiber distribution system of claim 1 wherein the first wall is a sidewall and the second wall is a bottom wall, wherein the guide structure is a bracket coupled to the first wall at a position below the splitter modules such that inactive output fibers extend vertically downward from the splitter modules through the inactive fiber routing channel defined by the bracket.

* * * * *